United States Patent [19]

Mapp

[11] 4,047,318
[45] Sept. 13, 1977

[54] ATTRACTOR ELEMENT FOR FISHING LURE

[76] Inventor: Alan L. Mapp, 676-A Third St., Maxwell AFB, Montgomery, Ala. 36113

[21] Appl. No.: 733,204

[22] Filed: Oct. 18, 1976

[51] Int. Cl.² ............................................. A01K 85/00
[52] U.S. Cl. .................................................. 43/42.24
[58] Field of Search ................. 43/42.24, 42.28, 42.3, 43/42.02, 42.09; D22/27

[56] References Cited

U.S. PATENT DOCUMENTS

| 3,959,912 | 6/1976 | Lee | 43/42.28 |
| 3,983,656 | 10/1976 | Bain | 43/42.24 |
| D. 239,281 | 3/1976 | Williams, Jr. | 43/42.24 |
| D. 241,346 | 9/1976 | Carver | D22/27 |
| D. 243,175 | 1/1977 | Carver | D22/27 |

Primary Examiner—Warner H. Camp
Attorney, Agent, or Firm—Woodford R. Thompson, Jr.

[57] ABSTRACT

An attractor element embodying a first and a second pliable leg connected at their forward ends to each other and to a fishing lure. The first leg extends outwardly and rearwardly from its forward end and then inwardly and terminates in a free end rearwardly of its forward end. The second leg extends outwardly and rearwardly from its forward end and away from the first leg and then inwardly around the free end of the first leg with the second leg being longer than the first leg and terminating in a free end rearwardly of the first leg.

10 Claims, 6 Drawing Figures

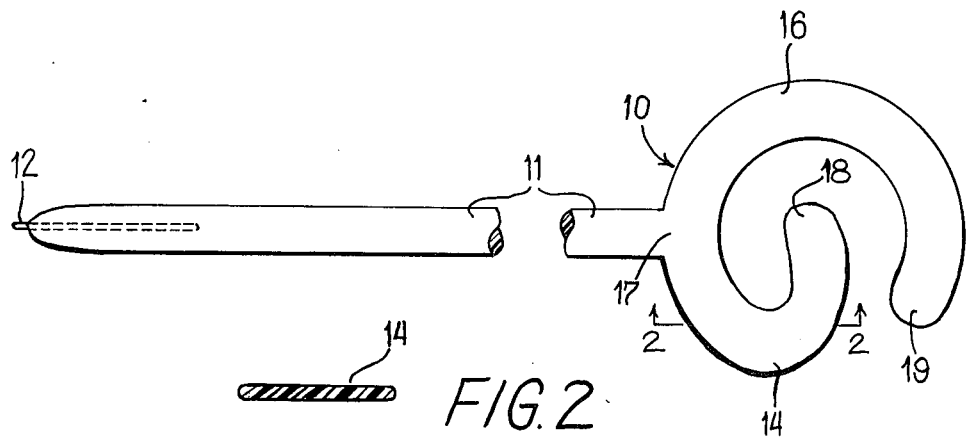
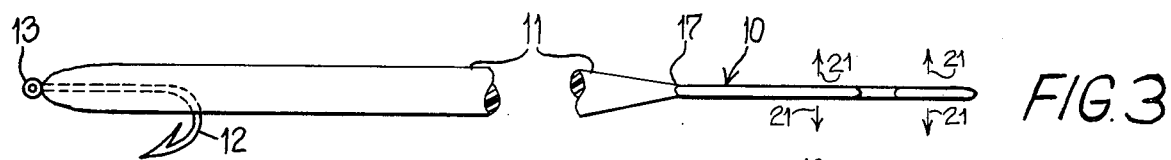
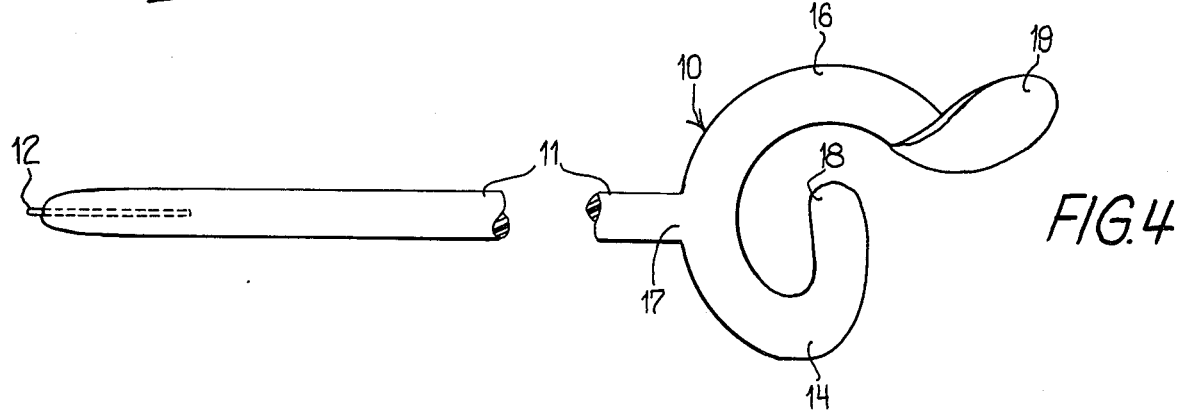
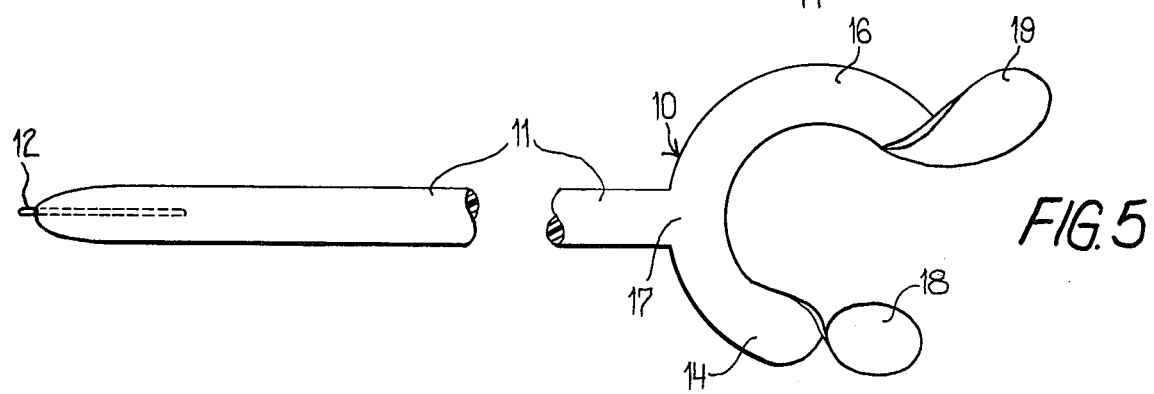
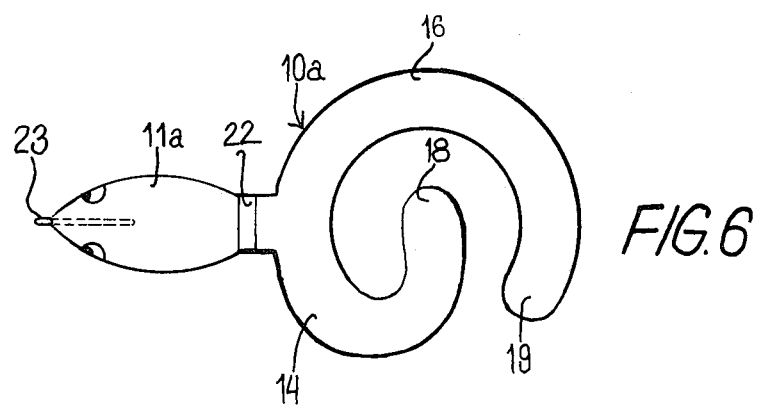

ATTRACTOR ELEMENT FOR FISHING LURE

BACKGROUND OF THE INVENTION

This invention relates to an attractor element for a fishing lure which provides a natural life-like movement for the fishing lure which causes the natural instinct of the fish to strike the lure.

Heretofore in the art to which my invention relates, many types of attractor elements have been proposed for fishing lures wherein one or more tail-like members are provided which produce a spiral movement of the lure through the water, such as shown in U.S. Pat. Nos. 3,100,360 and 3,037,316. Also, fishing lures have been provided with arcuate sections which move from a coiled position to an uncoiled position as the lure is moved through the water, such as shown in U.S. Pat. Nos. 3,158,953, 2,690,026, and 2,519,338.

SUMMARY OF THE INVENTION

In accordance with my invention, I provide an attractor element for a fishing lure which embodies a pair of pliable legs which are connected at their forward ends to the fishing lure and extend outwardly away from each other. One leg is shorter than the other and extends outwardly and rearwardly from its forward end and then inwardly and terminates in a free end rearwardly of its forward end. The longer leg extends outwardly and rearwardly and then inwardly around the free end of the shorter leg and terminates in a free end rearwardly of the shorter leg.

Due to the differences in length of the two arcuate legs and the differences in the circumferences thereof, contrasting actions are provided in the two leg sections. The longer leg section opens more easily so as to produce a slow undulation and vibration when the lure moves slowly through the water or when the lure is motionless in a slow moving current. However, upon faster relative movement between the lure and the water, the longer leg section opens to a longer length with a quicker undulation and the shorter leg section begins to flutter or move into a motion of faster, shorter and more rapid undulation from that of the longer leg section. The lack of motion of the smaller leg section, when the lure is moved slowly through water lends stability to the lure by helping to prevent a spiraling action due to the rudder effect of the shorter leg section. When the shorter leg section begins to move or flutter as the lure is moved through the water at a faster rate, a drag effect is provided at each side of the attractor element thus aiding in the prevention of a spiraling action of the lure. In addition, the sudden onset of fast undulation of the shorter leg section produces the effect of or imitates the fright-flight action of natural prey. Accordingly, there is a variation of the visual and vibratory stimulii produced by the two leg sections jointly or separately. That is, the start-stop action of the lure whether done intentionally by the angler or by accidental encounter of an underwater obstacle creates and recreates the fright-flight simulation of natural prey.

Attractor elements for fishing lures embodying features of my invention are illustrated in the accompanying drawing, forming a part of this application, in which:

FIG. 1 is a top plan view showing my attractor element formed integrally with a fishing lure in the form of a plastic worm;

FIG. 2 is a sectional view taken generally along the line 2—2 of FIG. 1;

FIG. 3 is a side elevational view of the fishing lure shown in FIG. 1;

FIG. 4 is a top plan view of the lure shown in FIG. 1 showing movement of the free end of the longer leg section only which occurs when there is relatively slow movement between the lure and the water;

FIG. 5 is a top plan view of the lure shown in FIG. 4 but showing movement of the free ends of both leg sections, which occurs when there is a faster rate of movement between the lure in the water; and, FIG. 6 is a top plan view showing a modified form of my invention wherein the actuator element is detachably connected to the rear end of a conventional rigid lure body.

DETAILED DESCRIPTION

Referring not to the drawing for a better understanding of my invention, I show in FIGS. 1 through 5 an attractor element 10 which is formed integrally with the rear end of a fishing lure 11 which is shown as being in the form of a resilient and pliable plastic worm. In view of the fact that such plastic worms are well known in the art to which my invention relates, no further description thereof is deemed necessary. The forward end of the lure 11 is adapted to receive a fishing hook 12 having an eye 13 for attaching the usual fishing line.

My improved attractor element 10 comprises a first pliable leg section 14 and a second pliable leg section 16 with the forward ends of the leg sections 14 and 16 being formed integrally with the rear end of the lure 11 as at 17. The first leg section 14 extends outwardly and rearwardly from its forward end and then inwardly and terminates in a free end 18 rearwardly of the forward end of the leg section 14. The second leg section 16 extends outwardly and rearwardly from its forward end and away from the first leg sections 14 and then extends inwardly around the free end of the first leg section 14, as clearly shown in FIG. 1, with the leg section 16 being longer than the leg section 14 and terminating in a free end 19 which is located rearwardly of the first leg section 14.

As shown in FIG. 1, the leg sections 14 and 16 of the attractor element 10 are arcuate in shape, as viewed in plan, with the circumference of the leg section 16 being greater than the circumference of leg section 14. Also, the free ends 18 and 19 of the leg sections 14 and 16, respectively, are rounded, as shown. Where the actuator element 10 is employed on a plastic worm-type lure 11, I form the forward ends of the leg sections 14 and 16 integrally with each other and integrally with the rear end of the plastic lure 11. It will thus be seen that the first leg section 14 and the second leg section 16 combined define a generally G-shaped figure, as viewed in plan, with the lower portion of the G-shaped figure being connected to the fishing lure 11.

As shown in FIGS. 2 and 3, the leg sections 14 and 16 are flat and extend in a common plane with motion of the free ends of the leg sections 14 and 16 being in planes perpendicular to the common plane in which the flat legs extend. That is, the free ends 18 and 19 of the leg sections 14 and 16 move in the direction of the arrows 21, as shown in FIG. 3. Also, as shown in FIG. 3, each leg section 14 and 16 is substantially the same thickness and width throughout the length thereof. However, the leg sections 14 and 16 may vary in thickness and width to produce a desired visual image and also to vary the flutter or vibratory motion of the leg sections. The leg sections are formed of a suitable pliable material, such as polyvinyl plastics, leather, woven materials and the like.

Referring now to FIG. 6 of the drawing, I show a modified form of my invention in which an attractor element 10a substantially identical to the attractor element 10 described hereinabove is attached to a conventional type rigid or hard lure 11a. That is, the attractor element 10a comprises the leg sections 14 and 16 which terminate in end portions 18 and 19, respectively. The forward end of the attractor element 10a is adapted for connection to the rear end of the body of the lure 10a by suitable connector means 22. That is, the attractor element 10a may be attached to the rear end of the body of lure 11a by a suitable adhesive or may be secured thereto by other suitable means which would suggest itself to one skilled in the art. The forward end of the body of the lure 11a carries a conventional fish hook or hooks 23 as shown.

From the foregoing description, the operation of my improved attractor element for a fishing lure will be readily understood. Upon moving the lure 11 or 11a, as the case may be, through the water at a slow speed only the longer leg section 16 is caused to move and vibrate or flutter, as shown in FIG. 4. That is, less force is required to start movement or vibration of the free end 19 of leg section 16 since leg section 16 is longer than leg section 14 and the circumference of the arcuate portion of leg 16 is greater than the circumference of the arcuate portion of leg 14, thus presenting a larger surface area which contacts the water as the attractor element moves therethrough.

Upon moving the lure through the water at a predetermined faster speed the shorter leg section 14 will also vibrate or flutter, as shown in FIG. 5. That is, the free end of the smaller leg section 14 only flutters when the lure is moved at a faster rate of speed. The leg sections 14 and 16 thus have two different and distinct movements that produce water vibrations singularly or together. Also, the leg sections 14 and 16 produce two different and changing visual images as the attractor element is moved through the water. That is, the free end of the leg section 16 moves outwardly more easily due to the large surface area and length thereof, thus giving a slow undulation and vibration when the lure is moved slowly relative to the water. Also, the leg section 16 extends to a longer length with a quicker undulation as the lure is moved through the water at a faster rate. Since the shorter leg section 14 has less surface area to contact the water and is of a shorter length, the shorter leg section 14 does not flutter or vibrate until a predetermined speed is reached above the speed at which the longer leg section 16 flutters or vibrates. Accordingly, a natural, life-like artificial bait is provided. Since the shorter leg section 14 does not vibrate at slow speeds relative to the water, the short leg section produces a rudder effect which adds stability. In like manner, when the shorter leg section 14 begins to flutter or vibrate, a double drag effect is provided at the sides of the lure which maintains stability. The sudden or fast undulation of the shorter leg section 14 imitates the fright-flight action of natural prey, whereby by selectively varying the manner in which the lure is drawn through the water, various effects may be obtained.

While I have shown my invention in two forms, it will be obvious to those skilled in the art that it is not so limited, but is susceptible of various other changes and modifications without departing from the spirit thereof.

What is claimed is:

1. An attractor element for a fishing lure comprising:
   a. a first pliable leg section,
   b. a second pliable leg section,
   c. means connecting the forward ends of said first and second leg sections to a fishing lure,
   d. said first leg section extending outwardly and rearwardly from its forward end and then inwardly and terminating in a free end rearwardly of its forward end, and
   e. said second leg section extending outwardly and rearwardly from its forward end and away from said first leg section and then inwardly around said free end of said first leg section with said second leg section being longer than said first leg section and terminating in a free end rearwardly of said first leg section.

2. An attractor element as defined in claim 1 in which said first leg section and said second leg sections are arcuate as viewed in plan with the circumference of said second leg section being greater than the circumference of said first leg section.

3. An attractor element as defined in claim 1 in which said free ends of said first leg section and said second leg section are rounded.

4. An attractor element a defined in claim 1 in which said forward ends of said first leg section and said second leg section are formed integrally with each other.

5. An attractor element as defined in claim 1 in which said forward ends of said first leg section and said second leg section are formed integrally with the body of a fishing lure.

6. An attractor element as defined in claim 1 in which said forward ends of said first leg section and said second leg section are formed integrally with an attachment member which is attachable to a fishing lure.

7. An attractor element as defined in claim 1 in which said first leg section and said second leg section combined define a generally G-shaped figure as viewed in plan with the lower portion of said G-shaped figure being connectable to a fishing lure.

8. An attractor element as defined in claim 1 in which said first and second leg sections are generally flat and extend in a common plane with motion of the free ends of said leg sections being in planes perpendicular to said common plane.

9. An attractor element as defined in claim 8 in which each of said leg sections is of substantially the same thickness and width throughout the length thereof.

10. An attractor element as defined in claim 1 in which the free end of said second leg section is adapted to flutter in response to movement of said attractor element through water at a predetermined speed and the free end of said first leg section is adapted to flutter in response to movement of said attractor element through water at a predetermined faster speed than the speed at which the free end of said second leg section flutters.

* * * * *